Sept. 29, 1953   H. J. REITER   2,653,366
PRONG CAP FOR SNAP FASTENERS
Filed Aug. 18, 1948
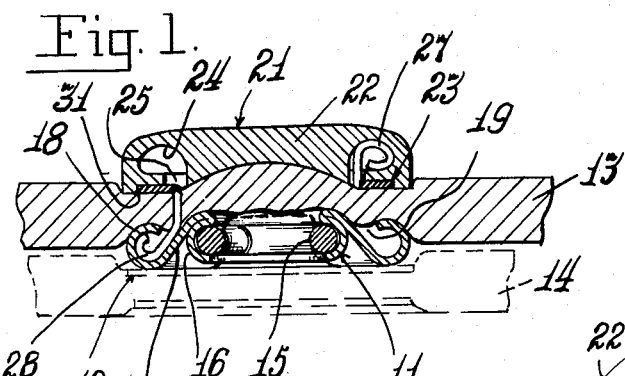
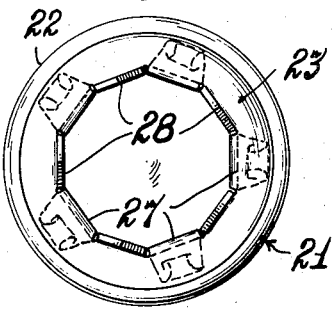
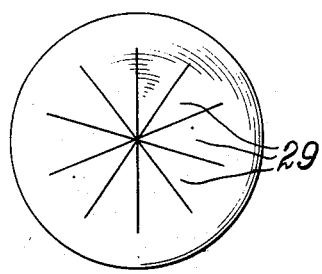
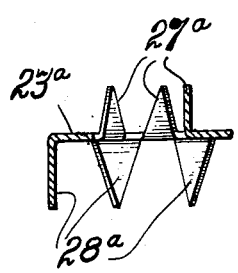
*INVENTOR.*
HAROLD J. REITER.
BY
*ATTORNEY*

Patented Sept. 29, 1953

2,653,366

UNITED STATES PATENT OFFICE 2,653,366

PRONG CAP FOR SNAP FASTENERS

Harold J. Reiter, Chicago, Ill.; Gertrude Reiter, administratrix of said Harold J. Reiter, deceased, assignor to Rau Fastener Company, Providence, R. I., a corporation of Rhode Island Application August 18, 1948, Serial No. 44,817

1 Claim. (Cl. 24—216)

This application is a continuation-in-part of application Serial No. 695,030, filed September 6, 1946, now abandoned.

The invention relates to improvements in caps for snap fasteners and, more particularly, to an ornamental cap having a novelly constructed one-piece attaching ring formed with prongs adapted to be embedded in the cap and to have fastening engagement with a related fastening part.

Ornamental caps for snap fasteners may be fabricated from a plurality of parts suitably joined to present an unbroken outside or exposed surface and means on its under surface to pierce the sheet of material, upon which it is carried, and engage in a fastener part. One such cap is illustrated in the principal disclosure of the co-pending application aforementioned. In that disclosure, the cap includes an undercut body having a ring secured to its bottom face by means of an expansible axial tubular portion. Piercing prongs depend from the ring. These prongs, however, are bent down from and are integral with the outer peripheral diameter of the ring in the same manner as the prongs shown in the Fig. 5 disclosure herein. Although such an attaching ring is very practical and functions with a high degree of efficiency, it might be observed that the presence of the prongs on the outside peripheral edge of the ring necessitates the use of an objectionably large blank of material.

It should be observed further that the diameter of the circle along which the outside prongs are bent is determined by the diameter of a receiving channel provided in the associated fastener part. As a consequence, the axial tubular portion is proportionately small, thus affording a possible weak joining between the body and the ring and, perhaps more important, necessitating the production of a body having a prong-receiving area of a diameter distinctly different from the diameter of the fastening channel present in a standard fastener part.

The disclosure herein is superior to the disclosure in Fowler Patent No. 2,255,970, wherein the attaching member is fabricated from two prong-rings, one of which is channeled to embrace the peripheral edge of the other for securing the rings together. A built-up attaching ring is objectionable because of material and assembly costs and also because it presents an attaching member consisting of three thicknesses of material. The excessive material thickness increases the over-all thickness of a fastener installation which preferably is maintained at a minimum.

It is therefore an object of the present invention to provide a fastener installation of a kind that overcomes all of the principal objections now attributed to known installations of the kind discussed herein.

Another object is to provide an improved one-piece attaching ring of the character described.

Another object is to provide an attaching ring of minimum thickness with dual sets of fastening prongs integral therewith.

Another object is to provide an attaching ring having integral prong sets extending from opposed faces thereof and arranged on a common circle.

Other and further objects of the present invention will be apparent from the following description and claim, and are illustrated in the accompanying drawing which, by way of illustration, shows an exemplary embodiment and the principles thereof. Other embodiments of the invention embodying the same principles may be used, and structural changes may be made as desired by those skilled in the art, without departing from the present invention and the purview of the appended claim.

In the drawing:

Fig. 1 is an enlarged longitudinal central sectional view of a snap fastener assembly embodying features of the present invention.

Fig. 2 is a bottom plan view of the snap fastener cap element.

Fig. 3 is a perspective view of the attaching ring.

Fig. 4 is a view of the blank showing the divisions for the prong piercings.

Fig. 5 is a central sectional view through a modified form of attaching ring.

Referring particularly to the assembled snap fastener illustrated in Fig. 1, the installation includes a socket part 11 and a stud part 12. These parts are attached to oppositely disposed sheets of supporting material 13 and 14 respectively, and are adapted to interlock one with the other for holding the supporting sheets together. The features of the present invention are shown as being associated with the socket part 11, the stud part being shown attached to its supporting sheet 14 in any conventional manner. It should be understood, however, that the stud part 12 may be suitably fashioned for association with a cap element embodying the present invention.

The socket part 11 preferably is of a kind fashioned substantially ring-like, and includes a split ring 15 retained within a channeled circular wall 16 having its upper extremity folded outwardly radially to define a circular anvil portion 17. The anvil portion 17 has its margin reversedly curved to provide an inwardly curved flange 18 and define a circular opening 19 between the inwardly disposed edge of said flange and the anvil portion 17. The socket part is so designed as to be substantially entirely embedded within the sheet of supporting material 13 when attached.

The cap element 21, which is best illustrated in Figs. 1 and 2, embodies the preferred features of the present invention. It includes a body 22 formed in any desired shape of any suitable material such as plastic, leather, wood, metal or the like, and an annular attaching ring 23. The body 22 is provided on its bottom face with an annular outwardly flared undercut 24, which opens on the bottom face of the body to provide a circular receiving opening 25. In instances where the body is fabricated from relatively soft material capable of penetration, the receiving opening may be omitted.

The attaching ring 23, best shown in Fig. 3, is fabricated from a circular blank (Fig. 4) and includes a ring-like portion 26 having a plurality of sets of piercing prongs 27 and 28 struck out of the central area thereof. Each set of prongs 27 and 28 is integral with the inner peripheral edge of the ring-like portion 26. The prongs of each set are fashioned from alternate triangular segments 29 (Fig. 4) initially laid out on the circular blank in a manner which leaves the central area of the blank entirely devoid of material when the prongs are bent into the positions shown in Fig. 3. As there illustrated, it will be observed that the set of prongs 27 extends upwardly substantially at right angles to the plane of the ring portion 26, and that the set of prongs 28 extends downwardly substantially at right angles to said ring portion.

To assemble a body part 22 and the attaching ring 23, the set of prongs 27 is disposed in the circular receiving opening 25, whereupon pressure is applied to cause the prongs to project into and curl within the receiving channel 24. This affords a permanent connection between the attaching ring and the body 22. If desired, the bottom face of the body 22 may be recessed as at 31 to accommodate the attaching ring 23 so that, when assembled, the attaching ring is completely concealed.

It should be understood at this time that the assembled body 22 and attaching ring 23 may be supplied as a unit to the consumer although, if desired, attaching rings and bodies may be separately furnished so as to enable the user to select a body of any suitable material or contour for assembly. In either event, the assembled body and attaching ring constitute an ornamental cap having piercing prongs 28 depending from the bottom face thereof, which prongs are adapted to have fastening engagement with the socket part 11.

Such assembly is accomplished by positioning the fastener part 11 against one face of the supporting sheet 13 and locating an assembled cap element over the other face of said sheet in substantial alignment therewith. Pressure then is applied downwardly on the cap element to cause the prongs 28 to pierce the supporting sheet 13 and enter the circular space 19 provided in the socket part, whereupon said prongs strike the outwardly curved anvil portion 17 of said part and are curled radially outwardly into the reversedly curved annular underlying marginal flange 18.

A fastener assembled in this manner is permanently attached to the supporting sheet, and the supporting sheet is firmly secured between the socket part and the cap element. The provision of attaching prongs on both sides of the attaching ring and on a common circle insures firm mounting of the cap body on the ring and also simplifies assembly because it is immaterial which set of prongs, 27 or 28, is associated with the body 22. A fastener installation of this character is of minimum thickness owing to the single material thickness of the attaching ring which is embedded in the bottom face of the body 22.

The attaching ring illustrated in Fig. 5 is substantially like that previously described, except that the set of attaching prongs 28a is integral with and bent down from the outside periphery of the ring portion 23a. In this disclosure, the set of prongs 27a is struck up from and is integral with the inner peripheral edge of the ring portion 23a. It should be quite evident that, owing to present standardization of the diameter of the prong-receiving channel 19 in a standard socket or stud part, the outside diameter of the attaching ring portion 23a necessarily corresponds to the diameter of the channel. This limitation in the over-all size of the ring reduces the diameter of the circle along which the set of prongs 27a is bent and, accordingly, the attachment of the prongs 27a to a body is not as strong as the attachment effected by the use of an attaching ring of the kind shown in Fig. 3. It has been found, however, that an attaching ring of the kind shown in Fig. 5 is adequate for most installations.

The instant fastener installation is such as to enable the use of cap elements having any desired shape or configuration and provided with any desired surface ornamentation without necessitating any material alteration in the physical characteristics of the cap element as a whole. The invention is capable of being associated with socket parts or stud parts embodying a wide variety of modifications in their specific construction, it being only necessary that such socket or stud parts be provided with a suitably channeled marginal portion to receive the attaching prongs 28 or 28a. Also, other modifications in the detail structure of the cap element may be effected without departing from the spirit of the invention or the scope of the appended claim.

I claim:

The combination with a fastener adapted to be secured to one face of a supporting sheet, of an attaching part for securing the fastener part to said supporting sheet, said attaching part being arranged against the other face of said supporting sheet and including an attaching ring, a plurality of prongs extending from one face of said ring and integral with the inner peripheral edge thereof, said prongs being adapted to pierce the supporting sheet and having fastening engagement with the fastener part, a plurality of prongs extending from the other face of said ring and integral with the inner peripheral edge thereof, and a body forming a part of the attaching part in which said last-named prongs have fastening engagement.

HAROLD J. REITER.

References Cited in the file of this patent

UNITED STATES PATENTS

| Number | Name | Date |
|---|---|---|
| 324,422 | Smith | Aug. 18, 1885 |
| 1,083,269 | Bradnack | Jan. 6, 1914 |
| 1,377,154 | Flynn | May 3, 1921 |
| 1,451,429 | Lontz | Apr. 10, 1923 |
| 1,806,522 | De Gruyter | May 19, 1931 |
| 2,131,347 | Fenton | Sept. 27, 1938 |
| 2,212,361 | Arthur | Aug. 20, 1940 |
| 2,255,970 | Fowler | Sept. 16, 1941 |
| 2,312,441 | Reiter | Mar. 2, 1943 |